United States Patent
Cifuentes et al.

(10) Patent No.: US 10,966,429 B2
(45) Date of Patent: Apr. 6, 2021

(54) SYNERGISTIC METHODS OF USING BENZOXABOROLE COMPOUNDS AND PRESERVATIVE GASES AS AN ANTIMICROBIAL FOR CROPS

(71) Applicant: AGROFRESH INC., Collegeville, PA (US)

(72) Inventors: Rodrigo Cifuentes, Santiago (CL); Daniel MacLean, Woodland, CA (US); Renee Engle-Goodner, Sacramento, CA (US); Timothy Malefyt, Stroudsburg, PA (US)

(73) Assignee: AGROFRESH INC., Philadelphia, PA (US)

( * ) Notice: Subject to any disclaimer, the term of this patent is extended or adjusted under 35 U.S.C. 154(b) by 184 days.

(21) Appl. No.: 15/452,499

(22) Filed: Mar. 7, 2017

(65) Prior Publication Data

US 2017/0251673 A1 Sep. 7, 2017

Related U.S. Application Data

(60) Provisional application No. 62/304,636, filed on Mar. 7, 2016.

(51) Int. Cl.
| | | |
|---|---|---|
| A01N 55/08 | (2006.01) |
| A01N 59/04 | (2006.01) |
| A01N 59/02 | (2006.01) |
| A01N 25/12 | (2006.01) |

(52) U.S. Cl.
CPC ............. *A01N 55/08* (2013.01); *A01N 25/12* (2013.01); *A01N 59/02* (2013.01); *A01N 59/04* (2013.01)

(58) Field of Classification Search
None
See application file for complete search history.

(56) References Cited

U.S. PATENT DOCUMENTS

| | | |
|---|---|---|
| 3,686,398 A | 8/1972 | Kohn et al. |
| 3,873,279 A | 3/1975 | Singer |
| 4,421,774 A | 12/1983 | Vidal et al. |
| 4,843,956 A | 7/1989 | Lashlee |
| 5,880,188 A | 3/1999 | Austin et al. |
| 5,958,463 A | 9/1999 | Milne |
| 6,305,148 B1 | 10/2001 | Bowden et al. |
| 7,078,546 B2 | 7/2006 | Piers |
| 7,119,049 B2 | 10/2006 | Rieck et al. |
| 7,176,228 B2 | 2/2007 | Elbe et al. |
| 7,179,840 B2 | 2/2007 | Rieck et al. |
| 7,208,169 B2 | 4/2007 | Dunkel et al. |
| 7,390,806 B2 | 6/2008 | Lee et al. |
| 7,393,856 B2 | 7/2008 | Bellinger-Kawahara et al. |
| 7,465,836 B2 | 12/2008 | Lee et al. |
| 7,582,621 B2 | 9/2009 | Baker et al. |
| 7,652,000 B2 | 1/2010 | Perry et al. |
| 7,767,657 B2 | 8/2010 | Baker et al. |
| 7,816,344 B2 | 10/2010 | Baker et al. |
| 7,842,823 B2 | 11/2010 | Chang et al. |
| 7,888,356 B2 | 2/2011 | Lee et al. |
| 7,968,752 B2 | 6/2011 | Lee et al. |
| 8,039,450 B2 | 10/2011 | Akama et al. |
| 8,039,451 B2 | 10/2011 | Baker et al. |
| 8,106,031 B2 | 1/2012 | Lee et al. |
| 8,110,259 B2 | 2/2012 | Siegel |
| 8,115,026 B2 | 2/2012 | Baker et al. |
| 8,168,614 B2 | 5/2012 | Baker et al. |
| 8,343,944 B2 | 1/2013 | Xia et al. |
| 8,436,028 B2 | 5/2013 | Hunt et al. |
| 8,440,642 B2 | 5/2013 | Baker et al. |
| 8,461,134 B2 | 6/2013 | Hernandez et al. |
| 8,461,135 B2 | 6/2013 | Akama et al. |
| 8,461,336 B2 | 6/2013 | Zhou et al. |
| 8,461,364 B2 | 6/2013 | Wheeler et al. |
| 8,470,803 B2 | 6/2013 | Akama et al. |
| 8,501,712 B2 | 8/2013 | Baker et al. |
| 8,546,357 B2 | 10/2013 | Akama et al. |
| 8,669,207 B1 | 3/2014 | Jacobson et al. |
| 8,791,258 B2 | 7/2014 | Chang et al. |
| 8,906,848 B2 | 12/2014 | Wuts et al. |
| 9,138,001 B2 | 9/2015 | Maclean et al. |
| 9,138,002 B2 | 9/2015 | Jacobson et al. |
| 9,145,429 B2 | 9/2015 | Jarnagin et al. |
| 9,185,914 B2 | 11/2015 | Frackenpohl et al. |
| 9,309,508 B2 | 4/2016 | Benkovic et al. |
| 9,346,834 B2 | 5/2016 | Zhou et al. |

(Continued)

FOREIGN PATENT DOCUMENTS

| | | |
|---|---|---|
| AU | 2010203096 | 2/2010 |
| AU | 2012327171 | 6/2013 |

(Continued)

OTHER PUBLICATIONS

Baker, et al., (2006). "Discovery of a New Boron-Containing Antifungal Agent, 5-Fluoro-1,3-dihydro-1-hydroxy-2,1-benzoxaborole (AN2690), for the Potential Treatment of Onychomycosis." Journal of Medicinal Chemistry 49(15): 4447-4450.

Rock, et al., (2007). "An Antifungal Agent Inhibits an Aminoacyl-tRNA Synthetase by Trapping tRNA in the Editing Site." Science 316(5832): 1759-1761.

International Search Report and Written Opinion, International Application No. PCT/US2017/020940, dated May 23, 2017, 7 pages.

Dauthy "Fruit and vegetable processing: Chapter 5.3 Chemical Preservation" FAO Agricultural Services Bulletin, 1995, No. 119.

Reddy et al., "1-MCP, a novel plant growth regulator for regulation of ripening" Agricultural & Horticultural Sciences, 2014, vol. 2.

(Continued)

*Primary Examiner* — Sarah Alawadi

(74) *Attorney, Agent, or Firm* — Barnes & Thornburg LLP

(57) ABSTRACT

The present disclosure relates to methods for using benzoxaborole compounds in combination with preservative gases, such as carbon dioxide or sulfur dioxide, as an antimicrobial that synergistically controls pathogens of agricultural crops.

14 Claims, No Drawings

(56) References Cited

U.S. PATENT DOCUMENTS

| | | |
|---|---|---|
| 9,426,996 B2 | 8/2016 | Maclean et al. |
| 9,493,489 B2 | 11/2016 | Jacobs et al. |
| 9,493,490 B1 | 11/2016 | Akama et al. |
| 9,512,148 B2 | 12/2016 | Chellappan et al. |
| 9,572,823 B2 | 2/2017 | Baker et al. |
| 9,585,396 B2 | 3/2017 | Malefyt et al. |
| 9,617,285 B2 | 4/2017 | Akama et al. |
| 9,676,796 B2 | 6/2017 | Kim et al. |
| 9,730,454 B2 | 8/2017 | Jacobson |
| 9,737,075 B2 | 8/2017 | Benkovic et al. |
| 9,889,146 B2 | 2/2018 | Alley et al. |
| 9,944,660 B2 | 4/2018 | Soni et al. |
| 10,011,616 B2 | 7/2018 | Zhang et al. |
| 10,040,806 B2 | 8/2018 | Rajan et al. |
| 10,051,864 B2 | 8/2018 | Stoller et al. |
| 10,070,649 B2 | 9/2018 | Malefyt et al. |
| 10,159,252 B2 | 12/2018 | Jacobson et al. |
| 2004/0259842 A1 | 12/2004 | Mikoshiba et al. |
| 2007/0155699 A1 | 7/2007 | Baker et al. |
| 2007/0286822 A1 | 12/2007 | Sanders et al. |
| 2007/0293457 A1 | 12/2007 | Baker et al. |
| 2008/0153992 A1 | 6/2008 | Knott et al. |
| 2008/0293675 A1 | 11/2008 | Lee et al. |
| 2008/0317737 A1 | 12/2008 | Patel et al. |
| 2009/0148623 A1 | 6/2009 | Sandmeier |
| 2009/0170861 A1 | 7/2009 | Aslanian et al. |
| 2009/0227541 A1 | 9/2009 | Baker et al. |
| 2009/0239824 A1 | 9/2009 | Lee et al. |
| 2009/0291917 A1 | 11/2009 | Akama et al. |
| 2010/0004205 A1 | 1/2010 | Mayer |
| 2010/0158992 A1 | 6/2010 | Black et al. |
| 2010/0190748 A1 | 7/2010 | Baker et al. |
| 2010/0256092 A1 | 10/2010 | Xia |
| 2010/0267981 A1 | 10/2010 | Baker et al. |
| 2010/0292504 A1 | 11/2010 | Baker et al. |
| 2011/0059985 A1 | 3/2011 | Schmidts et al. |
| 2011/0076261 A1 | 3/2011 | Patel et al. |
| 2011/0082118 A1 | 4/2011 | Patel et al. |
| 2011/0123624 A1 | 5/2011 | Zasloff |
| 2011/0124597 A1 | 5/2011 | Hernandez et al. |
| 2011/0136763 A1 | 6/2011 | Xia et al. |
| 2011/0152217 A1 | 6/2011 | Wheeler et al. |
| 2011/0166103 A1 | 7/2011 | Akama et al. |
| 2011/0166104 A1 | 7/2011 | Zhou et al. |
| 2011/0172187 A1 | 7/2011 | Hernandez et al. |
| 2011/0183969 A1 | 7/2011 | Birch |
| 2011/0190235 A1 | 8/2011 | Chen et al. |
| 2011/0207701 A1 | 8/2011 | Zhou et al. |
| 2011/0207702 A1 | 8/2011 | Jacobs et al. |
| 2011/0212918 A1 | 9/2011 | Hernandez et al. |
| 2011/0319361 A1 | 12/2011 | Baker et al. |
| 2012/0035132 A1 | 2/2012 | Jarnagin et al. |
| 2012/0115813 A1 | 5/2012 | Hernandez et al. |
| 2012/0214765 A1 | 8/2012 | Akama et al. |
| 2012/0264714 A1 | 10/2012 | Baker et al. |
| 2012/0289686 A1 | 11/2012 | Baker et al. |
| 2012/0295875 A1 | 11/2012 | Zhou et al. |
| 2013/0059802 A1 | 3/2013 | Baker et al. |
| 2013/0059803 A1 | 3/2013 | Baker et al. |
| 2013/0064783 A1 | 3/2013 | Baker et al. |
| 2013/0131016 A1 | 5/2013 | Akama et al. |
| 2013/0131017 A1 | 5/2013 | Akama et al. |
| 2013/0165411 A1 | 6/2013 | Gordeev et al. |
| 2013/0196433 A1 | 8/2013 | Raines et al. |
| 2013/0210770 A1 | 8/2013 | Baker et al. |
| 2013/0231304 A1 | 9/2013 | Jacobs et al. |
| 2013/0244980 A1 | 9/2013 | Baker et al. |
| 2013/0298290 A1* | 11/2013 | Haas .................. A01N 25/02 800/298 |
| 2013/0316979 A1 | 11/2013 | Baker et al. |
| 2014/0088041 A1 | 3/2014 | Koop |
| 2014/0155305 A1 | 6/2014 | Hartshorne et al. |
| 2014/0259230 A1 | 9/2014 | Bobbio et al. |
| 2014/0349853 A1 | 11/2014 | Maclean et al. |
| 2015/0202321 A1 | 7/2015 | Alam |
| 2016/0199351 A1 | 7/2016 | Rappleye |
| 2016/0324160 A1* | 11/2016 | Benkovic .................. A01N 55/08 |
| 2016/0340369 A1 | 11/2016 | Chen et al. |
| 2017/0000132 A1 | 1/2017 | Rajan et al. |
| 2017/0000133 A1 | 1/2017 | Rajan et al. |
| 2017/0037258 A1 | 2/2017 | Benkovic et al. |
| 2017/0042966 A1 | 2/2017 | Van der Weerden et al. |
| 2017/0280724 A1 | 6/2017 | Jacobson et al. |
| 2017/0216327 A1 | 8/2017 | Coronado et al. |
| 2017/0295809 A1 | 10/2017 | Malefyt et al. |
| 2017/0319536 A1 | 11/2017 | Blaszczyk et al. |
| 2017/0327519 A1 | 11/2017 | Akama et al. |
| 2017/0340607 A1 | 11/2017 | Birch et al. |
| 2017/0355719 A1 | 12/2017 | Hernandez et al. |
| 2018/0000089 A1 | 1/2018 | Stierli et al. |
| 2018/0000090 A1 | 1/2018 | Rajan et al. |
| 2018/0009831 A1 | 1/2018 | Ravishanker |
| 2018/0016285 A1 | 1/2018 | Baker et al. |
| 2018/0065994 A1 | 3/2018 | Akama et al. |
| 2018/0139975 A1 | 5/2018 | Malefyt et al. |
| 2018/0179229 A1 | 6/2018 | Barbosa et al. |
| 2018/0179233 A1 | 6/2018 | Gamsey et al. |
| 2018/0201628 A1 | 7/2018 | James et al. |
| 2018/0213781 A1 | 8/2018 | Muehlebach et al. |
| 2018/0220654 A1 | 8/2018 | Jacobson et al. |
| 2018/0230169 A1 | 8/2018 | Ramanujachary |
| 2018/0244699 A1 | 8/2018 | Rajan et al. |

FOREIGN PATENT DOCUMENTS

| | | |
|---|---|---|
| AU | 2012327230 | 7/2013 |
| CA | 2190155 | 12/1995 |
| CA | 2635680 | 7/2007 |
| CA | 2642583 | 8/2007 |
| CA | 2680587 | 9/2009 |
| CN | 101505603 | 8/2009 |
| DE | 102012006458 A1 | 9/2013 |
| EP | 0765331 | 9/2000 |
| EP | 1444981 | 8/2004 |
| EP | 1980564 | 10/2008 |
| EP | 1765360 | 11/2009 |
| EP | 1765358 | 2/2011 |
| EP | 2343304 | 7/2011 |
| EP | 2564857 | 3/2013 |
| GB | 961280 | 6/1964 |
| GB | 1006336 | 6/1965 |
| GB | 1396904 | 6/1975 |
| WO | 1995031970 | 11/1995 |
| WO | 199533754 | 12/1995 |
| WO | 1998021945 | 5/1998 |
| WO | 2005087742 | 9/2005 |
| WO | 2006089067 | 8/2006 |
| WO | 2006102604 | 9/2006 |
| WO | 2007071632 | 6/2007 |
| WO | 2007078340 | 7/2007 |
| WO | 2007095638 | 8/2007 |
| WO | 2007131072 | 11/2007 |
| WO | 2007146965 | 12/2007 |
| WO | 2008064345 | 5/2008 |
| WO | 2008070257 | 6/2008 |
| WO | 2008115385 | 9/2008 |
| WO | 2008156798 | 12/2008 |
| WO | 2008157726 | 12/2008 |
| WO | 2009046098 | 4/2009 |
| WO | 2009053741 | 4/2009 |
| WO | 2009111676 | 9/2009 |
| WO | 2009130481 | 10/2009 |
| WO | 2009140309 | 11/2009 |
| WO | 2009144473 | 12/2009 |
| WO | 2010027975 | 3/2010 |
| WO | 2010028005 | 3/2010 |
| WO | 2010045503 | 4/2010 |
| WO | 2010045505 | 4/2010 |
| WO | 2010080558 | 7/2010 |
| WO | 2010136475 | 12/2010 |
| WO | 2011017125 | 2/2011 |
| WO | 2011019612 | 2/2011 |
| WO | 2011019616 | 2/2011 |
| WO | 2011019618 | 2/2011 |

(56) References Cited

FOREIGN PATENT DOCUMENTS

| | | |
|---|---|---|
| WO | 2011022337 | 2/2011 |
| WO | 2011037731 | 3/2011 |
| WO | 2011043817 | 4/2011 |
| WO | 2011049971 | 4/2011 |
| WO | 2011060196 | 5/2011 |
| WO | 2011060199 | 5/2011 |
| WO | 2011063293 | 5/2011 |
| WO | 2011094450 | 8/2011 |
| WO | 2011116348 | 9/2011 |
| WO | 2011150190 | 12/2011 |
| WO | 2012033858 | 3/2012 |
| WO | 2012067663 | 5/2012 |
| WO | 2012069652 | 5/2012 |
| WO | 2012139134 | 10/2012 |
| WO | 2012154213 | 11/2012 |
| WO | 2013033270 | 3/2013 |
| WO | 2013050591 | 4/2013 |
| WO | 2013057740 | 4/2013 |
| WO | 2013058824 | 4/2013 |
| WO | 2013078070 | 5/2013 |
| WO | 2013078071 | 5/2013 |
| WO | 2013093615 | 6/2013 |
| WO | 2013108024 | 7/2013 |
| WO | 2013110005 | 7/2013 |
| WO | 2013154759 | 10/2013 |
| WO | 2015/097237 | 2/2015 |
| WO | 2015/175157 | 11/2015 |
| WO | 2016015094 | 2/2016 |
| WO | 2016151293 | 9/2016 |
| WO | 2017102565 | 6/2017 |
| WO | 2007079119 | 7/2017 |
| WO | 2017125835 | 7/2017 |
| WO | 2017136930 | 8/2017 |
| WO | 2017180695 | 10/2017 |
| WO | 2017183043 | 10/2017 |
| WO | 2017207358 A1 | 12/2017 |
| WO | 2017216191 A1 | 12/2017 |
| WO | 2017216722 A2 | 12/2017 |
| WO | 2018060140 A1 | 4/2018 |
| WO | 2018102261 | 6/2018 |
| WO | 2018156554 A1 | 8/2018 |
| WO | 2018160845 A1 | 9/2018 |

OTHER PUBLICATIONS

Kumar, J.S. et al., "Development of Practical Methodologies for the Synthesis of Functionalized Benzoboroxoles", Tetrahendron Letters, Elsevier, Amsterdam, NL, Col. 51, No. 34, Aug. 24, 2010, pp. 4482-4485.
Mao, W., "AN2690, a topical antifungal agent in development for the treatment of onychmycosis represents a new class and has a novel mechanism of action", Anacor Pharmaceuticals AG, Aug. 20, 2008, XP007921849, www.anacor.com/pdf/SID_p769.pdf [retrieved on Jul. 11, 2013]. XP007921849, wwww.
Ding et al., "Design, Synthesis, and Structure—Activity Relationship of *Trypanosoma brucei* Leucyl-tRNA Synthetase Inhibitors as Antitrypanosomal Agents," J. Med. Chem. (2011), vol. 54(5), pp. 1276-1287.
Alexander et al., "Imprinted Polymers as Protecting Groups for Regioselective Modification of Polyfunctional Substrates", Journal of American Chemical Society, 1999, pp. 6640-6651, vol. 121, United Kingdom (12 pages).
Haynes et al., "Arylboronic Acids. Vlll. Reactions of Boronophthalide", Noyes Chemical Laboratory, University of Illinois, Nov. 1964, pp. 3229-3233 Urbana, USA (5 pages).
Brown et al., "Convenient Procedures for the Preparation of Alkyl Borate Esters," Proc. For Prepn. Alkyl Borate Esters, Aug. 5, 1956, pp. 3613-3614.
Shen et al., "Changes of respiration and ethylene production and effects of 1-MCP during the fermentation softening of chinese winter jujube fruit," Zhongguo Nongye Daxue Xuebao (2004) vol. 9(2), pp. 36-39.
Guillen et al., "Efficacy of 1-MCP treatment in tomato fruit 2. Effect of cultivar and ripening stage at harvest," Postharvest Biology and Technol. (2006) vol. 42(3), pp. 235-242.
Carillo et al., "1-Methylcyclopropene delays arazá ripening and improves postharvest fruit quality," LWT-Food Sci. and Tech. (2011) vol. 44, pp. 250-255.
Brown et al., "Convenient Procedures for the Preparation of Alkyl Borate Esters," Procedures for Preparation of Alkyl Borate Esters, contribution from the Department of Chemistry of Purdue University, Aug. 5, 1956, 3613-3614.
Pubchem entry for AN2718 (https://pubchem.ncbi.nlm.nih.gov/compound/11845944) accessed Mar. 1, 2020.
Seiradake E, et al., "Antifungal activity and mechanism of action of a benzoxaborole, AN2718, which is in development for the treatment of Tinea pedis," Abstract F1-1176, IDSA Poster Session: New Anti-Fungal Agents (2008).
Mao W, et al., "AN2718 has broad spectrum antifungal activity necessary for the topical treatment of skin and nail fungal infections," Abstract P2422, J. American Acad. Dermatology 60(3) Supplement 1, AB116 (2009).
Rolshausen PE, et al., "Use of boron for the control of Eutypa dieback of grapevines," Plant Diseases 89(7): 734-738 (2005).
Qin G, et al., "Inhibitory effect of boron against Botrytis cinerea on table grapes and its possible mechanisms of action," International Journal of Food Microbiology 138: 145-150 (2010).
Thomidis T and Exadaktylou E., "Effect of boron on the development of brown rot (Monilinia laxa) on peaches," Crop Prot. 29: 572-576 (2010).
Expert Declaration of Phillip M. Brannen, Ph.D., filed in an Inter Partes Review of U.S. Pat. No. 10,130,096, filed Nov. 5, 2019.
Boric Acid, Chemical Watch Factsheet, 21, 18-19 (2001).
Ligon JM, et al, "Natural products with antifungal activity from Pseudomonas biocontrol bacteria," Pest Management Science 56: 688-695 (2000).
Alumni Product Registration (Jun. 9, 2010).
Propi-Shield Product Registration (Aug. 11, 2005).
Tilt Label (2006).
Mahmoud Yag, et al., "Recent approaches for controlling brown spot disease of faba bean in Egypt," Egypt Acad. J. Biol. Sci. 3: 41-53 (2011).
Ware G, "Substituted aromatics," pp. 148-149, In: Fundamentals of Pesticides: a self-instruction guide, Tomson Publications, Fresno, CA (1991).
Bertelsen Jr, et al., "Fungicidal effects of azoxystrobin and epoxiconazole on phyllosphere fungi, senescence and yield of winter wheat," Plant Pathology 50: 190-205 (2001).
Propi-Shield Label Amendment (Nov. 29, 2006).
Azotech Label Amendment (Sep. 7, 2007).
PptiSHIELD Label (2009).
Abound label (2007).
Chlorosel label (2010).
Ultrex label (2005).
Chloroneb Fact Sheet (2005).
Dichloran Label Amendment (Aug. 5, 2010).
Expert Declaration of Dennis Hall, Ph.D. filed in an Inter Partes Review of U.S. Pat. No. 10,130,096, filed Nov. 5, 2019.
Patent Owner Preliminary Response filed in an Inter Partes Review of U.S. Pat. No. 10,130,096, filed Feb. 18, 2020.
Dictionary Reference filed in an Inter Partes Review of U.S. Pat. No. 10,130,096.
Petition for Inter Partes Review of U.S. Pat. No. 10,130,096, filed Nov. 5, 2019.
Marsh et al., J. Good Sc. 2007, vol. 72, R39-R54.
Edwards, "Organoboron reagents and recent strategies in rhodium catalysed additions," Ph. D. Thesis submitted to University of Bath, 2011, pp. 1-293.
Ma, X. et al.,"Synthesis of Boroxine-Linked Aluminium Complexes," Inorg. Chem., 2011, 50, 2010-2014.
Greig, L. et al., "The dynamic covalent chemistry of mono- and bifunctional boroxoaromatics", Tetrahedron, 2006, 63, 2391-2403.
Weike, Z. et al.,"Preparation of 2-oxygen derivatives of 1,2-oxaborolane from 2-allyloxy-1,2-oxaborolane," Journal of Organometallic Chemistry, 1990, 387, 131-146.

(56) References Cited

OTHER PUBLICATIONS

Office Action for Japanese Patent Application No. 2016-517975, dated Dec. 24, 2019, 4 pages.
International Search Report for PCT/US2014/013510, Dow AgroSciences LLC, dated Jun. 25, 2014.
"Smart Fog ES-100 models Installation and Operation Manual", Jan. 1, 2012 (Jan. 1, 2012), pp. 1-30, KP0557247260, U.S.A., Retrieved from the Internet: URL:https://smartfog.com/pdf/mn_es100.pfd (retrieved on Aug. 24, 2020).

* cited by examiner

SYNERGISTIC METHODS OF USING BENZOXABOROLE COMPOUNDS AND PRESERVATIVE GASES AS AN ANTIMICROBIAL FOR CROPS

CROSS-REFERENCE TO RELATED APPLICATION

This application claims the benefit under 35 USC § 119(e) of U.S. Provisional Patent Application Ser. No. 62/304,636, filed on Mar. 7, 2016, the entire disclosure of which is incorporated herein by reference.

FIELD OF THE PRESENT APPLICATION

The present application relates to methods for using benzoxaborole compounds with preservative gases, such as carbon dioxide or sulfur dioxide, as an antimicrobial to control or inhibit pathogens of agricultural crops.

BACKGROUND

Benzoxaborole is a drug known to be effective in treating eukaryotic fungal and parasitic infections. For example, benzoxaborole is used to treat fungal conditions affecting the toenails and fingernails of humans, such as Onychomycosis. Benzoxaborole is also known to be an effective treatment of Human African Trypanosomiasis, commonly called African Sleeping Sickness, which is caused by *T. brucei* parasites that infect thousands of people annually in sub-Saharan Africa.

One mechanism by which benzoxaborole has been shown to exhibit antimicrobial effects is by blocking or inhibiting protein synthesis in fungi. Benzoxaborole has also been shown to block fungal cytoplasmic leucyl-tRNA synthetase (LeuRS) to exhibit antimicrobial effects. Additional mechanisms of action by which benzoxaborole acts as an antibacterial, an antifungal, or an antimicrobial are not yet understood.

Benzoxaborole has also been shown to have antimicrobial effects in plants. For example, a benzoxaborole compound was proven to be effective as a volatile plant fungicide. The present disclosure describes methods of using benzoxaborole compounds combined with preservative gases, such as carbon dioxide ($CO_2$) and sulfur dioxide ($SO_2$), to inhibit plant pathogens. More specifically, the present disclosure provides methods of using benzoxaboroles combined with $CO_2$ or $SO_2$ to provide synergistic antimicrobial protection to plants and plant parts that is advantageous to other previously described antimicrobial treatments of plants.

SUMMARY OF THE INVENTION

The present disclosure provides a method of treating plants with an antimicrobial agent. The method comprises placing one or more plants in a chamber, and sealing the chamber. The method also comprises adding a benzoxaborole compound to the sealed chamber. The method further comprises adding a preservative gas to the sealed chamber, wherein the benzoxaborole compound and the preservative gas combine in the chamber to form a treatment. Finally, the method provides for administering the treatment to the plants, and then, unsealing the chamber.

In the method described herein, the one or more plants may be a strawberry or a grape. In addition, the benzoxaborole compound of the present method may be Compound A, Compound B, and/or Compound C. Finally, in the present method of treating plants, the preservative gas may be $CO_2$. All embodiments, features, elements, or limitations of the methods described herein are combinable with other embodiments, features, elements, or limitations of the methods described herein.

DETAILED DESCRIPTION

The following numbered embodiments are contemplated and are non-limiting:

1. A method of treating plants with an antimicrobial agent comprising:
   placing one or more plants or plant parts in a chamber,
   sealing the chamber,
   adding a benzoxaborole compound to the chamber,
   adding a preservative gas to the chamber,
   wherein the benzoxaborole compound and the preservative gas combine to form an antimicrobial treatment,
   administering the antimicrobial treatment to the one or more plants or plant parts in the sealed chamber, and
   unsealing the chamber.

2. The method of clause 1 or clause 2, wherein the one or more plants or plant parts is a soft fruit.

3. The method of clause 1, wherein the preservative gas is $CO_2$ or $SO_2$.

4. The method of clause 2 or clause 3, wherein the soft fruit is selected from the group consisting of a strawberry, a raspberry, a blackberry, and a grape.

5. The method of any one of clauses 1 to 4, wherein the benzoxaborole compound is selected from the group consisting of Compound A, Compound B, Compound C, and combinations thereof.

6. The method of any one of clauses 1 to 5, wherein the benzoxaborole compound is Compound A having the structure:

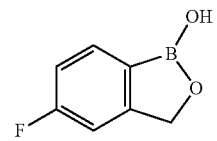 [SMILES: OB1OCc2cc(F)ccc21]

or an analog or a derivative thereof.

7. The method of any one of clauses 1 to 5, wherein the benzoxaborole compound is Compound B having the structure:

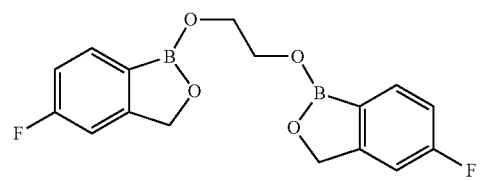 [SMILES: Fc1ccc2c(c1)COB2OCCOB1OCc2cc(F)ccc21]

or an analog or a derivative thereof.

8. The method of any one of clauses 1 to 5, wherein the benzoxaborole compound is Compound C having the structure:

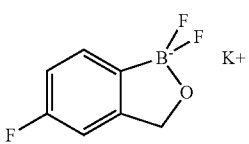

or an analog or a derivative thereof.

9. The method of any one of clauses 1 to 8, wherein the benzoxaborole compound is in the form of a liquid, a gas, a fog, or a solid.

10. The method of clause 9, wherein the solid benzoxaborole compound is a powder.

11. The method of any one of clauses 1 to 10, wherein the preservative gas is $CO_2$.

12. The method of any one of clauses 1 to 10, wherein the preservative gas is $SO_2$.

13. The method of any one of clauses 1 to 11, wherein the $CO_2$ concentration of the antimicrobial treatment ranges from about 4% to about 20%.

14. The method of any one of clauses 1 to 10 and 12, wherein the $SO_2$ concentration of the antimicrobial treatment ranges from about 0.001% to about 1%.

15. The method of any one of clauses 1 to 11 and 13, wherein the $CO_2$ concentration of the antimicrobial treatment is about 12%.

16. The method of any one of clauses 1 to 15, wherein the antimicrobial treatment is in the form of a spray, a mist, a gel, a thermal fog, a non-thermal fog, a dip, a drench, a vapor, a gas, or sublimation.

17. The method of any one of clauses 1 to 16, wherein administering the antimicrobial treatment comprises release of the antimicrobial treatment from a material selected from the group consisting of a sachet, a synthetic film, a natural film, a liner, a gas-releasing generator, a compressed gas cylinder, a non-compressed gas cylinder, a cylinder comprising dissolved Supercritical $CO_2$, and a droplet inside a box.

18. The method of any one of clauses 1 to 17, wherein the antimicrobial treatment further comprises a component selected from the group consisting of 1-methylcylopropene, adjuvants, and pesticides.

19. The method of any one of clauses 1 to 18, wherein the antimicrobial treatment further comprises a treatment carrier.

20. The method of clause 19, wherein the treatment carrier comprises a liquid, a gas, a solution, a solvent, and a chemical.

21. The method of clause 19 or clause 20, wherein the treatment carrier is Supercritical $CO_2$.

22. The method of clause 19 or clause 20, wherein the treatment carrier is selected from the group consisting of water, saline, a buffer, a solution, and a solvent.

23. The method of any one of clauses 1 to 22, wherein the antimicrobial treatment is effective against plant pathogens.

24. The method of clause 23, wherein the plant pathogens are fungal pathogens.

25. The method of clause 23 or clause 24, wherein plant pathogens are selected from the group consisting of *Acremonium* spp., *Albugo* spp., *Alternaria* spp., *Ascochyta* spp., *Aspergillus* spp., *Botryodiplodia* spp., *Botryospheria* spp., *Botrytis* spp., *Byssochlamys* spp., *Candida* spp., *Cephalosporium* spp., *Ceratocystis* spp., *Cercospora* spp., *Chalara* spp., *Cladosporium* spp., *Colletotrichum* spp., *Cryptosporiopsis* spp., *Cylindrocarpon* spp., *Debaryomyces* spp., *Diaporthe* spp., *Didymella* spp., *Diplodia* spp., *Dothiorella* spp., *Elsinoe* spp., *Fusarium* spp., *Geotrichum* spp., *Gloeosporium* spp., *Glomerella* spp., *Helminthosporium* spp., *Khuskia* spp., *Lasiodiplodia* spp., *Macrophoma* spp., *Macrophomina* spp., *Microdochium* spp., *Monilinia* spp., *Monilochaethes* spp., *Mucor* spp., *Mycocentrospora* spp., *Mycosphaerella* spp., *Nectria* spp., *Neofabraea* spp., *Nigrospora* spp., *Penicillium* spp., *Peronophythora* spp., *Peronospora* spp., *Pestalotiopsis* spp., *Pezicula* spp., *Phacidiopycnis* spp., *Phoma* spp., *Phomopsis* spp., *Phyllosticta* spp., *Phytophthora* spp., *Polyscytalum* spp., *Pseudocercospora* spp., *Pyricularia* spp., *Pythium* spp., *Rhizoctonia* spp., *Rhizopus* spp., *Sclerotium* spp., *Sclerotinia* spp., *Septoria* spp., *Sphaceloma* spp., *Sphaeropsis* spp., *Stemphyllium* spp., *Stilbella* spp., *Thielaviopsis* spp., *Thyronectria* spp., *Trachysphaera* spp., *Uromyces* spp., *Ustilago* spp., *Venturia* spp., and *Verticillium* spp., and bacterial pathogens, such as *Bacillus* spp., *Campylobacter* spp., *Clavibacter* spp., *Clostridium* spp., *Erwinia* spp., *Escherichia* spp., *Lactobacillus* spp., *Leuconostoc* spp., *Listeria* spp., *Pantoea* spp., *Pectobacterium* spp., *Pseudomonas* spp., *Ralstonia* spp., *Salmonella* spp., *Shigella* spp., *Staphylococcus* spp., *Vibrio* spp., *Xanthomonas* spp., and *Yersinia* spp.

26. The method of any one of clauses 23 to 25, wherein the plant pathogens are selected from the group consisting of *Botrytis cinerea*, *Mucor piriformis*, *Fusarium sambucinum*, *Aspergillus brasiliensis*, and *Peniciliium expansum*.

27. The method of any one of clauses 1 to 26, wherein the chamber is sealed.

28. The method of any one of clauses 1 to 27, wherein the temperature of the chamber ranges from 1° C. to 25° C.

29. The method of any one of clauses 1 to 28, wherein the chamber is air-tight.

30. The method of any one of clauses 1 to 29, wherein the chamber is semipermeable or impermeable.

31. The method of any one of clauses 1 to 30, wherein the chamber is made of a material selected from the group consisting of plastic, glass, cellulosic material, and cement.

32. The method of any one of clauses 1 to 31, wherein the chamber comprises a port, an outlet, or both.

33. The method of any one of clauses 1 to 32, wherein the chamber may have a volume ranging from about 10 L to about 50 L.

34. The method of any one of clauses 1 to 32, wherein the chamber may have a volume ranging from about 0.5 $cm^3$ to about 150 $cm^3$.

35. The method of any one of clauses 1 to 32, wherein the chamber may have a volume ranging from about 100 $cm^3$ to about 10,000 $cm^3$.

36. The method of any one of clauses 1 to 35, wherein the one or more plants or plant parts are manually or robotically placed in the chamber.

37. The method of any one of clauses 1 to 36, wherein the one or more plants or plant parts are treated for an initial time period ranging from about 12 hours to about 5 days.

38. The method of any one of clauses 1 to 37, wherein the antimicrobial treatment concentration ranges from about 0.0001 mg/L to about 0.5 mg/L.

39. The method of any one of clauses 1 to 38, wherein the time to administer the antimicrobial treatment ranges from about 3 seconds to about 2 hours.

40. The method of any one of clauses 1 to 39, wherein the method results in synergistic inhibition of plant pathogens on the one or more treated plants or plant parts.

The term "plant(s)" and "plant parts" include, but are not limited to, plant cells and plant tissues, such as leaves, calli, stems, roots, fruits, vegetables, flowers or flower parts, pollen, egg cells, zygotes, seeds, cuttings, cell or tissue cultures, or any other part or product of a plant. A class of plants that may be used in the present invention is generally as broad as the class of higher and lower plants including, but not limited to, dicotyledonous plants, monocotyledonous plants, and all horticultural crops.

Horticultural crops, include, but are not limited to, vegetable crops, fruit crops, edible nuts, flowers and ornamental crops, nursery crops, aromatic crops, and medicinal crops. More specifically, horticultural crops of the present disclosure include, but are not limited to, fruits (e.g., grape, apple, pear, and persimmon) and berries (e.g., strawberries, blackberries, blueberries, and raspberries).

The phrase "preservative gases" refers to chemicals in their gaseous form that acts as a preservative of the plants and plant parts of the present invention. For example, the preservative gases of the present application help maintain the appearance, freshness, flavor, and prevents rotting of the plants and plant parts of the present invention. Exemplary preservative gases of the present invention include, but are not limited to carbon dioxide ($CO_2$) and sulfur dioxide ($SO_2$).

The phrase "Supercritical $CO_2$" refers to a solvent wherein the fluid state of carbon dioxide ($CO_2$) is held at or above its critical temperature and critical pressure. Typically, $CO_2$ at or above its critical temperature and critical pressure can adopt properties that are between a gas and a liquid. More specifically, the $CO_2$ may behave as a supercritical fluid at or above its critical temperature and critical pressure, such that the $CO_2$ can fill a container like a gas, but has a density like a liquid.

Compounds and Components of the Present Methods

The methods of the present disclosure are directed to using benzoxaborole compounds in combination with preservative gases or chemicals as an antimicrobial to treat plants or plant pants. The methods of the present disclosure to treat plant or plant parts comprise, consist essentially of, or consist of benzoxaborole compounds.

Exemplary embodiments of the compounds of the present disclosure comprise Compounds A, B, and C, which may encompass diastereomers and enantiomers of the illustrative compounds. Enantiomers are defined as one of a pair of molecular entities which are mirror images of each other and non-superimposable. Diastereomers or diastereoisomers are defined as stereoisomers other than enantiomers. Diastereomers or diastereoisomers are stereoisomers not related as mirror images. Diastereoisomers are characterized by differences in physical properties.

One exemplary embodiment of a benzoxaborole compound of the present method is Compound A:

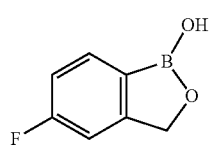 [SMILES: OB1OCc2cc(F)ccc21]

or an analog or derivative thereof. An additional illustrative embodiment of a benzoxaborole compound of the present method is Compound B:

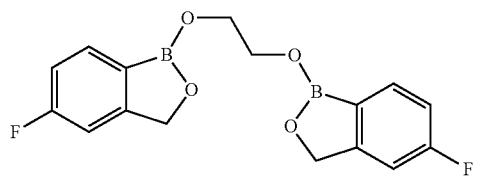 [SMILES: Fc1ccc2c(c1)COB2OCCOB1OCc2cc(F)ccc21]

or an analog or derivative thereof.

Another exemplary embodiment of a benzoxaborole compound of the present method is Compound C, which is a salt version of Compounds A and/or B:

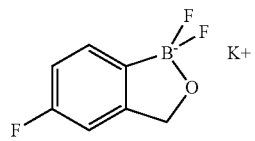

or an analog or derivative thereof.

Compounds A, B, and/or C may be used individually or as a mixture or combination. The benzoxaborole compounds may also be used in combination with preservative gases or chemicals to form a benzoxaborole treatment. The benzoxaborole treatment provides antimicrobial protection to plants or plant parts when administered, applied, or exposed to plants or plant parts.

Benzoxaborole Compounds A, B, and/or C may be used in any form, including, but not limited to, a liquid, a solid (e.g., a powder), or a gaseous composition. In particular, the present method provides application of a benzoxaborole compound as, for example, a spray, a mist, a gel, a thermal and non-thermal fog, a dip or a drench, or via sublimation, a vapor, or a gas. Additional examples of benzoxaborole treatment administration include, but are not limited to, release from a sachet, a synthetic or natural film, a liner or other packaging materials, a gas-releasing generator, compressed or non-compressed gas cylinder, dissolved in Supercritical $CO_2$ within a cylinder, a droplet inside a box, or other similar methods as described in U.S. Pat. Nos. 8,669,207, 9,138,001, and 9,138,001, and U.S. Patent Publication No. 2014/0349853, which are incorporated herein by reference.

The active compounds may be applied to plants or plant parts in a volume of a chamber. A chamber of the present disclosure may be any sealable container from which a gas or chemical cannot easily escape once it has been introduced to the sealed chamber. For example, a chamber may be made of plastic, glass, or any other semipermeable or impermeable material.

The chamber may have a port (e.g., a bulkhead septum port) for the introduction of the chemical treatment, either as a gas or liquid (e.g., water or solvent-based solution containing the product) or a fog. The chamber may also have an outlet to vent or remove the unused portion of the treatment carrier.

Carriers of the present disclosure may be combined with active benzoxaborole compounds to form a benzoxaborole treatment. Treatment carriers of the present disclosure may comprise gases, solutions, solvents, or chemicals. For example, a liquid carrier of the present disclosure may comprise water, buffer, saline solution, a solvent, etc. Illustrative gas carriers for the present invention are Supercritical $CO_2$ and/or $CO_2$ contained in a steel cylinder.

A chamber of the present disclosure may be any container or material from which a gas or chemical can be introduced to a food product in the chamber. For example, a chamber may be made of plastic, glass, cellulosic material, cement, or any other semipermeable or impermeable material.

The chamber may be of any size that is large enough to hold plants and plant parts to be treated. For example, an exemplary chamber may have a volume of about 10 liters (L) to about 50 L, from about 20 L to about 40 L, from about 25 L to about 50 L, from about 30 L to about 40 L, from about 35 L to about 40 L, and at about 35 L or about 36 L. In addition, an illustrative chamber may be a pallet that may have a size, sealed or unsealed ranging from 0.5 cubic meters to about 150 cubic meters.

In addition, an exemplary chamber of the present invention may be a large storage room (e.g., a gymnasium) having a headspace of several hundred to several thousand cubic meters. Thus, an exemplary chamber of the present invention may have a headspace size ranging from 100 to about 10,000 cubic meters, from about 100 to about 8000 cubic meters, from about 100 to about 7500 cubic meters, from about 100 to about 5000 cubic meters, from about 200 to about 3000 cubic meters, and about 1000 cubic meters.

Gaseous benzoxaborole treatments may be applied to the plants or plants parts at a concentration that is applied over approximately 3 to about 5 seconds to about two hours. The gas chemical treatment concentration may be reported as the amount (milligrams, mg) of active ingredient (i.e., benzoxaborole compound) per volume (liter, L) of chamber headspace or amount (milligrams, mg) of active ingredient (i.e. benzoxaborole compound) per mass (kilogram, kg) of crop.

For example, the rate that the benzoxaborole treatment may be effectively applied in a chamber and/or to plants may range from 0.001 mg/L to 0.5 mg/L. For example, the rate of the benzoxaborole treatment may be from about 0.002 mg/L to about 0.2 mg/L, 0.002 mg/L to about 0.14 mg/L, 0.002 mg/L to about 0.035 mg/L, 0.002 mg/L to about 0.0088 mg/L, 0.002 mg/L to about 0.044 mg/L, from about 0.004 mg/L to about 0.15 mg/L, from about 0.0044 mg/L to about 0.14 mg/L, from about 0.0044 mg/L to about 0.0088 mg/L, from about 0.0044 mg/L to about 0.035 mg/L, from about 0.0088 mg/L to about 0.14 mg/L, from about 0.035 mg/L to about 0.14 mg/L, from about 0.0088 mg/L to about 0.035 mg/L, from about 0.001 mg/L to about 0.2 mg/L, from about 0.001 mg/L to about 0.14 mg/L, from about 0.001 mg/L to about 0.0088 mg/L, from about 0.001 mg/L to about 0.0044 mg/L, and at about 0.0044 mg/L, about 0.0088 mg/L, about 0.035 mg/L, and about 0.14 mg/L.

Exemplary preservative gases of the method described herein include, but are not limited to, carbon dioxide ($CO_2$) and sulfur dioxide ($SO_2$). Additional chemicals that may be combined with benzoxaborole compound in the present disclosure include, but are not limited to, 1-methylcyclopropene, adjuvant(s), and commercial pesticides. Further chemicals that may be used in the present method include some that have been federally recognized. For example, Food, Drug and Cosmetic Act §§201 and 409 Generally Recognized As Safe (GRAS) compounds and Federal Insecticide, Fungicide, and Rodenticide Act (FIFRA) §25(b) chemicals, including eugenol, clove, thyme or mint oils), natural compounds, or compounds derived from natural sources may also be used in the present method.

While any concentration of preservative gas or chemical that provides the antimicrobial effect described herein may be utilized, a percent of $CO_2$ gas or chemical that may be used in the present method includes, but is not limited to, from about 4% to about 20%, from about 5% to about 18%, from about 6% to about 17%, from about 7% to about 15%, from about 8% to about 14%, from about 8% to about 13%, from about 8% to about 12%, from about 5% to about 14%, from about 6% to about 13%, from about 7% to about 13%, and at about 8%, about 9%, about 10%, about 11%, about 12%, about 13%, and about 14%.

A percent of $SO_2$ gas or chemical that may be used in the present method includes, but is not limited to, from about 0.001% to about 1%, from about 0.005% to about 1%, from about 0.01% to about 1%, from about 0.05% to about 1%, and from about 0.1% to about 1%.

Any plants or plant parts, plant cells, or plant tissues may be treated using the present method. A class of plants that may be treated in the present invention is generally as broad as horticultural crops. Horticultural crops, include, but are not limited to, vegetable crops, fruit crops, edible nuts, flowers and ornamental crops, nursery crops, aromatic crops, and medicinal crops. More specifically, fruits (e.g., grape, apple, pear, and persimmon) and berries (e.g., strawberries, blackberries, blueberries, and raspberries) are plants encompassed by the present disclosure. It should be noted that any species of berries or fruits may be used in the present invention (e.g., Table grapes).

Plants and agricultural crops after harvest may be used in the method of the present application. For example, exemplary plants of the present invention include post-harvest plants and crops during field packing, palletization, in-box, during storage, and throughout the distribution network. Further, plants being transported by any mode, including, but not limited to local vehicles, transport trailers, marine containers, aircraft containers, etc. may be treated using the method described herein. For example, minimally-processed packaged products (e.g., packaged vegetables or fruits) may also be treated with the method described herein.

Methods of Using Benzoxaborole Compounds

The present disclosure is directed to methods of providing antimicrobial protection to plants from plant pathogens. More specifically, fungal plant pathogens may be treated, prevented, or eradicated by the method described herein. Exemplary, pathogens encompassed by the present disclosure include, but are not limited to, *Botrytis cinerea, Mucor piriformis, Fusarium sambucinum, Aspergillus brasiliensis*, and *Peniciliium expansum*. Additional pathogens encompassed by the present invention include, but are not limited to *Acremonium* spp., *Albugo* spp., *Alternaria* spp., *Ascochyta* spp., *Aspergillus* spp., *Botryodiplodia* spp., *Botryospheria* spp., *Botrytis* spp., *Byssochlamys* spp., *Candida* spp., *Cephalosporium* spp., *Ceratocystis* spp., *Cercospora* spp., *Chalara* spp., *Cladosporium* spp., *Colletotrichum* spp., *Cryptosporiopsis* spp., *Cylindrocarpon* spp., *Debaryomyces* spp., *Diaporthe* spp., *Didymella* spp., *Diplodia* spp., *Dothiorella* spp., *Elsinoe* spp., *Fusarium* spp., *Geotrichum* spp., *Gloeosporium* spp., *Glomerella* spp., *Helminthosporium* spp., *Khuskia* spp., *Lasiodiplodia* spp., *Macrophoma* spp.,

*Macrophomina* spp., *Microdochium* spp., *Monilinia* spp., *Monilochaethes* spp., *Mucor* spp., *Mycocentrospora* spp., *Mycosphaerella* spp., *Nectria* spp., *Neofabraea* spp., *Nigrospora* spp., *Penicillium* spp., *Peronophythora* spp., *Peronospora* spp., *Pestalotiopsis* spp., *Pezicula* spp., *Phacidiopycnis* spp., *Phoma* spp., *Phomopsis* spp., *Phyllosticta* spp., *Phytophthora* spp., *Polyscytalum* spp., *Pseudocercospora* spp., *Pyricularia* spp., *Pythium* spp., *Rhizoctonia* spp., *Rhizopus* spp., *Sclerotium* spp., *Sclerotinia* spp., *Septoria* spp., *Sphaceloma* spp., *Sphaeropsis* spp., *Stemphyllium* spp., *Stilbella* spp., *Thielaviopsis* spp., *Thyronectria* spp., *Trachysphaera* spp., *Uromyces* spp., *Ustilago* spp., *Venturia* spp., and *Verticillium* spp., and bacterial pathogens, such as *Bacillus* spp., *Campylobacter* spp., *Clavibacter* spp., *Clostridium* spp., *Erwinia* spp., *Escherichia* spp., *Lactobacillus* spp., *Leuconostoc* spp., *Listeria* spp., *Pantoea* spp., *Pectobacterium* spp., *Pseudomonas* spp., *Ralstonia* spp., *Salmonella* spp., *Shigella* spp., *Staphylococcus* spp., *Vibrio* spp., *Xanthomonas* spp., and *Yersinia* spp.

The benzoxaborole and preservative gas treatments may be applied to the plants or plants parts inside of a container or chamber. The chamber may be open or closed/sealed during application of the benzoxaborole and preservative gas treatment. Typically, the plants or plant parts are manually or robotically placed in the chamber, and the chamber is then sealed. The benzoxaborole and preservative gas treatment is then applied to the sealed chamber comprising the plants or plant parts via the port (e.g., a bulkhead septum port).

The benzoxaborole and preservative gas treatments are applied to the sealed chamber for an initial time period. For example, the plants may be exposed to the treatments in the chamber or sealed container for any initial time period. An illustrative initial time period may range from about 12 hours to about 5 days (120 hours), from about 1 day to about 4 days, from about 2 days to about 3.5 days, from about 2 days to about 3.5 days, and at about 3.5 days. The temperature of the sealed chamber can range from about 1° C. to about 25° C.

After expiration of the treatment time period, inhibition of plant pathogens may be assessed. For example, in vitro samples may have the growth of the pathogen on agar or in media assessed, evaluated, and compared to a control sample where no benzoxaborole or preservative gas treatment was administered or different treatment conditions were applied. Similarly, in vivo samples may have the severity and incidence of fungal or bacterial disease assessed, evaluated, and compared to a control sample where no benzoxaborole or preservative gas treatment was administered or different treatment conditions were applied.

Synergy of benzoxaborole compounds combined with a gas and/or a chemical to form a benzoxaborole treatment was determined using the Colby equation, $E=x+y-x*y/100$, where:

E=Expected efficacy expressed in percent (%) of untreated control, when using a mixture of the active Compounds A and B at the concentrations a and b, respectively.

x=Efficacy expressed in % of the untreated control, when using the active compound A at the concentration a y=Efficacy, expressed in % of the untreated control, when using the active compound B at the concentration b

EXAMPLES

Illustrative embodiments of the methods of the present disclosure are provided herein by way of examples. While the concepts and technology of the present disclosure are susceptible to broad application, various modifications, and alternative forms, specific embodiments will be described here in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The following experiments were used to determine synergy between benzoxaborole Compounds A, B, and/or C and preservative gases, such as carbon dioxide ($CO_2$) and sulfur dioxide ($SO_2$). Specific rates or any other unique conditions are noted within the corresponding results tables. Each experiment comprised an air-tight 36 liter (L) chamber (Fisher Scientific, P/N: 08-642-23C), fitted with a bulkhead septum port (Swagelok, P/N: SS-400-61, Solon, Ohio) used for treatment delivery, as well as for monitoring (using needle extraction) carbon dioxide ($CO_2$), sulfur dioxide ($SO_2$), oxygen ($O_2$) or other headspace samples. A variable speed fan (Thermaltake, Mobile Fan II, P/N: A1888, Taipei City, Taiwan) set to low was also used to circulate the headspace atmosphere.

In Vitro and In Vivo Experiments

In vitro and in vivo experiments were performed concurrently in triple replicates (i.e., triplicate) unless otherwise noted. For in vitro experiments, a single 6-well microtiter plate or three, 10-cm petri plates each containing half strength Potato Dextrose Agar were prepared. Each well or plate was inoculated with 1 microliter (µL) of $1\times10^5$ spores/ml of the appropriate pathogenic spore suspension (e.g., *Botrytis cinerea*, BOTRCI; *Penicillium expansum*, PENIEX; *Mucor piriformis*, MUCOPI; *Fusarium sambucinum* FUSASA; or *Aspergillus brasiliensis*, ASPEBR). The inoculated microtiter or petri plates were then sealed with a breathable film (AeraSeal; P/N: B-100, Excel Scientific, Victorville, Calif.).

For in vivo experiments, eight strawberry fruits per repetition were surface sterilized with a 70% ethanol solution. After sterilization, the strawberries were rinsed twice with deionized water. Each strawberry fruit was wounded using a T15 screwdriver tip to a uniform depth of eight mm (8 mm). Each fruit wound was inoculated with 20 µL of $1\times10^5$ spores/ml pathogen spore suspension of *B. cinerea* or *M. piriformis*. The strawberries were then placed with the stem facing downwards inside a 1-pound strawberry clamshell.

Similarly, table grape fruits were also tested in vivo. More specifically, 16-20 table grapes per repetition were washed and inoculated with pathogens (as described above for the strawberries). However, an ethanol-sterilized push pin, rather than a T15 screwdriver, was used to wound the stem-end of the grapes. The grapes were inoculated in the wound, and then arranged inside a 1-pint clamshell.

For treatment, the inoculated agar plates and clamshells containing fruits (e.g., strawberries and grapes) were placed inside a 36 L experimental chamber unit, which was then sealed prior to commencement of compound treatments. The chamber remained sealed throughout the duration of the experiment except for addition of treatment to the chamber, and post-treatment ventilation.

Benzoxaborole Compound and Preservative Gas Treatment of Agar Plates (In Vitro) and Fruits Benzoxaborole Compound A or Compound B was dissolved in acetone and dispensed onto a 60 mm Whatman #1 filter paper disk using a pipette. The acetone was permitted to evaporate for five minutes before the disk was placed on a watch glass in each chamber.

A 12% $CO_2$ headspace treatment was then established in the chamber by permitting 10 grams (g) of crushed dry ice placed in a weigh boat in the chamber to evaporate in the sealed chamber. However, the bulkhead port of the chamber was loosened to permit the release of internal pressure. Optionally, a fan was used during the initial hours of treatment (i.e., up to about 6 hours of treatment) to ensure uniform treatment exposure of fruits and plates.

Untreated controls and $CO_2$ treated chambers contained an acetone-treated disk with similar evaporation for five minutes. $CO_2$ and $O_2$ levels in the chamber were monitored using a handheld gas detector (Dansensor Checkpoint II; P/N 600111, Ringsted, Denmark). Temperature and relative humidity were also monitored within the chamber using data loggers (Onset HOBO; P/N U12-013, Bourne, Mass.).

The chamber for all in vitro and in vivo experiments was held at room temperature (i.e., from about 21° C. to about 23° C.) typically for about 3.5 days (i.e., about 84 hours) of treatment exposure. Chambers were then vented. After an additional 2-3 days with the chamber at room temperature, post-treatment radial growth (in mm) of each in vitro pathogen (see Examples 1-7, Tables 1-7) was measured on the inoculated plates using electronic calipers (Mitutoyo, P/N: CD-6-CX, Aurora, Ill.). In addition, the point of inoculation on fruits was assessed for indication of in vivo disease incidence (e.g., yes or no) and severity of disease incidence (see Examples 8-16, Tables 8-16). Disease severity was rated on a scale ranging from 0 to 4, where "0" indicated no disease severity, "1" indicated minimal disease severity, "2" indicated medium disease severity, "3" indicated high disease severity, and "4" indicated exceptionally high disease severity.

Synergy was determined using the following Colby equation, $$E = x + y - x*y/100, \text{ where:}$$

E=Expected efficacy expressed in percent (%) of untreated control, when using a mixture of the active Compounds A and B at the concentrations a and b, respectively.

x=Efficacy expressed in % of the untreated control, when using the active compound A at the concentration a a y=Efficacy, expressed in % of the untreated control, when using the active compound B at the concentration b

Example 1: Synergistic Inhibition of BOTRCI and PENIEX Pathogens by Benzoxaborole and $CO_2$ Treatment of Agar Plates (In Vitro)

Table 1 demonstrates that the present method may be used to inhibit growth of plant pathogens inoculated on agar plates. As expected, the plates treated with the control (i.e., air) showed the highest pathogenic growth of 34 mm of BOTRCI and 22.6 mm of PENIEX. Methods of treating plant pathogens were used on agar plates growing BOTRCI and PENIEX and treated with 12% $CO_2$ only had 28 mm and 18.6 mm of pathogenic growth, respectively. Plates growing BOTRCI and PENIEX and treated with 0.14 mg/L of benzoxaborole Compound A only had 16.3 mm and 17 mm of pathogenic growth, respectively. However, the plates treated with both benzoxaborole Compound A and 12% $CO_2$ showed no growth and 3.3 mm of growth for BOTRCI and PENIEX pathogens, respectively. The Colby calculations of 165.4 and 225 indicated that the benzoxaborole treatment of Compound A and $CO_2$ was synergistic over the other treatments to inhibit BOTRCI and PENIEX in vitro growth, respectively.

TABLE 1

Synergistic effect of benzoxaborole Compound A and $CO_2$ on inhibition of in vitro fungal growth of *Botrytis cinerea* (BOTRCI) and *Penicillium expansum* (PENIEX) when evaluated 2 days after treatment completion.[a,b,c,d]

| | | | Growth (diameter, mm) | | | | | |
|---|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | BOTRCI | 34.0 | 16.3 | 28.0 | 0.0 | 165.4 | Synergistic |
| A | 0.14 | PENIEX | 22.6 | 17.0 | 18.6 | 3.3 | 225.0 | Synergistic |

[a] Assay was performed using a 6-well microtiter plate
[b] Experiment was performed with 4 replicates
[c] Fan was used for first 6 hours of treatment Example 2: Synergistic Inhibition of PENIEX Pathogen by Benzoxaborole and $CO_2$ Treatment of Agar Plates (In Vitro)

Table 2 demonstrates that the present method may be used to inhibit growth of plant pathogens inoculated on agar plates. As expected, the plate treated with the control (i.e., air) showed the highest pathogenic growth of 24.6 mm of PENIEX. Methods of treating plant pathogens were used on agar plates growing PENIEX and treated with 12% $CO_2$ only had 21.3 mm of pathogenic growth. Plates growing PENIEX and treated with 0.14 mg/L of benzoxaborole Compound A only had 9.7 mm of pathogenic growth. However, the plates treated with both benzoxaborole Compound A and 12% $CO_2$ showed 5.2 mm of growth for PENIEX pathogens. The Colby calculation of 119.7 indicated that the benzoxaborole treatment with Compound A and $CO_2$ was synergistic over the other treatments to inhibit PENIEX growth in vitro.

TABLE 2

Synergistic effect of benzoxaborole Compound A and $CO_2$ on inhibition of in vitro fungal growth of *Penicillium expansum* (PENIEX) when evaluated 2 days after completion of treatment. [a, b, c]

| | | | Growth (diameter, mm) | | | | |
|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | PENIEX | 24.6 | 9.7 | 21.3 | 5.2 | 119.7 | Synergistic |

[a] Assay was performed using a 6-well microtiter plate
[b] Fan was used for first 6 hours of treatment
[c] Additional water vapor was added to each chamber to achieve >90% R.H.

Example 3: Synergistic Inhibition of BOTRCI and MUCOPI Pathogens by Benzoxaborole and $CO_2$ Treatment of Agar Plates (In Vitro)

Table 3 demonstrates that the present method may be used to inhibit growth of plant pathogens inoculated on agar plates. As expected, the plate treated with the control (i.e., air) showed the highest pathogenic growth of 35 mm for both BOTRCI and MUCOPI. Methods of treating plant pathogens were used on agar plates growing BOTRCI and MUCOPI and treated with 12% $CO_2$ only had 30.9 mm and 35 mm of pathogenic growth, respectively. Plates growing BOTRCI and MUCOPI and treated with 0.14 mg/L of benzoxaborole Compound A only had 5.5 mm and 22.3 mm of pathogenic growth, respectively. However, the plates treated with both benzoxaborole Compound A and 12% $CO_2$ showed 4.5 mm and 11 mm of growth for BOTRCI and MUCOPI pathogens, respectively. The Colby calculations of 101.2 and 189 indicated that the benzoxaborole treatment of Compound A and $CO_2$ was synergistic over the other treatments to inhibit BOTRCI and PENIEX in vitro growth, respectively.

TABLE 3

Synergistic effect of benzoxaborole Compound A and $CO_2$ on inhibition of in vitro fungal growth of *Mucor piriformis* (MUCOPI) and *Botrytis cinerea* (BOTRCI) when evaluated 2 days after completion of treatment. [a, b, c]

| | | | Growth (diameter, mm) | | | | |
|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | MUCOP | 35.0 | 22.3 | 35.0 | 11.0 | 189.0 | Synergistic |
| A | 0.14 | BOTRCI | 35.0 | 5.5 | 30.9 | 4.5 | 101.2 | Synergistic |

[a] Assay was performed using a 6-well microtiter plate
[b] Fan was used for first 6 hours of treatment
[c] Additional water vapor was added to each chamber to achieve >90% R.H.

Example 4: Synergistic Inhibition of BOTRCI and PENIEX Pathogens by Benzoxaborole and $CO_2$ Treatment of Agar Plates (In Vitro)

Table 4 demonstrates that the present method may be used to inhibit growth of plant pathogens inoculated on agar plates. As expected, the plate treated with the control (i.e., air) showed the highest pathogenic growth of 35 mm of BOTRCI and 25.3 mm of PENIEX. Methods of treating plant pathogens were used on agar plates growing BOTRCI and PENIEX and treated with 12% $CO_2$ only had 33.4 mm and 21.2 mm of pathogenic growth, respectively. Plates growing BOTRCI and PENIEX and treated with 0.14 mg/L of benzoxaborole Compound A only had 1.5 mm and 6.4 mm of pathogenic growth, respectively. However, the plates treated with both benzoxaborole Compound A and 12% $CO_2$ showed no growth and 0.5 mm of growth for BOTRCI and PENIEX pathogens, respectively. The Colby calculations of 104.3 and 124.4, respectively, indicated that the benzoxaborole treatment of Compound A and $CO_2$ was synergistic over the other treatments to inhibit BOTRCI and PENIEX growth in vitro.

TABLE 4

Synergistic effect of benzoxaborole Compound A and $CO_2$ on inhibition of in vitro fungal growth of *Botrytis cinerea* (BOTRCI) and *Penicillium expansum* (PENIEX) when evaluated 2 days after treatment completion. [a, b]

|  |  |  | Growth (diameter, mm) |  |  |  |  |  |
|---|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | BOTRCI | 35.0 | 1.5 | 33.4 | 0.0 | 104.3 | Synergistic |
| A | 0.14 | PENIEX | 25.3 | 6.4 | 21.2 | 0.5 | 124.4 | Synergistic |

[a] Assay was performed using a 6-well microtiter plate
[b] Fan was used for first 6 hours of treatment Example 5: Synergistic Inhibition of BOTRCI, PENIEX, FUSASA, and ASPEBR Pathogens by Benzoxaborole and $CO_2$ Treatment of Agar Plates (In Vitro)

Table 5 demonstrates that the present method may be used to inhibit growth of plant pathogens inoculated on agar plates. As expected, the plate treated with the control (i.e., air) showed the highest pathogenic growth of 32.9 mm of BOTRCI, 22.7 mm of PENSIEX, 33.9 mm of FUSASA, and 29.6 mm of ASPEBR. Methods of treating plant pathogens were used on agar plates growing BOTRCI, PENIEX, FUSASA, and ASPEBR and treated with 12% $CO_2$ only had 35 mm, 19.9 mm, 33.9 mm, and 26.2 mm of pathogenic growth, respectively. Plates growing BOTRCI, PENIEX, FUSASA, and ASPEBR and treated with 0.14 mg/L of benzoxaborole Compound A only had 3.6 mm, 10.2 mm, 5.0 mm, and 2.6 mm of pathogenic growth, respectively. However, the plates treated with both benzoxaborole Compound A and 12% $CO_2$ showed 3 mm, 8.6 mm, 3.8 mm, and no growth of BOTRCI, PENIEX, FUSASA, and ASPEBR pathogens, respectively. The Colby calculations of 102.9, 102.5, 104.0, and 108.3 indicated that the benzoxaborole treatment of Compound A and $CO_2$ was synergistic over the other treatments to inhibit BOTRCI, PENIEX, FUSASA, and ASPEBR in vitro growth, respectively.

Plates growing BOTRCI, PENIEX, FUSASA, and ASPEBR and treated with 0.14 mg/L of benzoxaborole Compound B only had 3.5 mm, 7.7 mm, 3.6 mm, and 3.6 mm of pathogenic growth, respectively. However, plates treated with both benzoxaborole Compound B and 12% $CO_2$ showed 2.7 mmm, 6.4 mm, 3.4 mm, and no growth of BOTRCI, PENIEX, FUSASA, and ASPEBR pathogens, respectively. The Colby calculations of 103.4, 102.4, 100.4, and 112.0 indicated that the benzoxaborole treatment of Compound B and $CO_2$ was synergistic over the other treatments to inhibit BOTRCI, PENIEX, FUSASA, and ASPEBR in vitro growth, respectively.

TABLE 5

Synergistic effect of benzoxaborole Compounds A or B and $CO_2$ on inhibition of in vitro fungal growth of *Botrytis cinerea* (BOTRCI), *Penicillium expansum* (PENIEX), *Fusarium sambucinum* (FUSASA), and *Aspergillus brasiliensis* (ASPEBR) when evaluated 2 days after completion of treatment. [a, b, c]

|  |  |  | Growth (diameter, mm) |  |  |  |  |  |
|---|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | BOTRCI | 32.9 | 3.6 | 35.0 | 3.0 | 102.9 | Synergistic |
| A | 0.14 | PENIEX | 22.7 | 10.2 | 19.9 | 8.6 | 102.5 | Synergistic |
| A | 0.14 | FUSASA | 33.9 | 5.0 | 33.9 | 3.8 | 104.0 | Synergistic |
| A | 0.14 | ASPEBR | 29.6 | 2.6 | 26.2 | 0.0 | 108.3 | Synergistic |
| B | 0.14 | BOTRCI | 32.9 | 3.5 | 35.0 | 2.7 | 103.4 | Synergistic |
| B | 0.14 | PENIEX | 22.7 | 7.7 | 19.9 | 6.4 | 102.4 | Synergistic |
| B | 0.14 | FUSASA | 33.9 | 3.6 | 33.9 | 3.4 | 100.4 | Synergistic |
| B | 0.14 | ASPEBR | 29.6 | 3.6 | 26.2 | 0.0 | 112.0 | Synergistic |

[a] Assay was performed using a 6-well microliter plate
[b] Fan was used for first 6 hours of treatment
[c] Additional water vapor was added to each chamber to achieve >90% R.H,

Example 6: Synergistic Inhibition of BOTRCI Pathogen by Benzoxaborole and $CO_2$ Treatment of Agar Plates (In Vitro)

Table 6 demonstrates that the present method may be used to inhibit growth of plant pathogens inoculated on agar plates. As expected, the plate treated with the control (i.e., air) showed the highest pathogenic growth of 85.0 mm of BOTRCI. Methods of treating plant pathogens were used on agar plates growing BOTRCI and treated with 12% $CO_2$ only had 78.9 mm of pathogenic growth. Plates growing BOTRCI and treated with 0.14 mg/L of benzoxaborole Compound A only had 13.2 mm of pathogenic growth. However, the plates treated with both benzoxaborole Compound A and 12% $CO_2$ showed 6.4 mm of growth for BOTRCI pathogens. The Colby calculation of 108.2 indicated that the benzoxaborole treatment with Compound A and $CO_2$ was synergistic over the other treatments to inhibit BOTRCI growth in vitro.

TABLE 6

Synergistic effect of benzoxaborole Compound A and $CO_2$ on inhibition of in vitro fungal growth of *Botrytis cinerea* (BOTRCI) when evaluated 3 days after completion of treatment. [a, b]

| Cmpd | Rate (mg/L) | Pathogen | Growth (diameter, mm) | | | | Colby Calculation | Outcome |
| --- | --- | --- | --- | --- | --- | --- | --- | --- |
| | | | Control (Air) | Cmpd | 12% $CO_2$ | Cmpd + 12% $CO_2$ | | |
| A | 0.14 | BOTRCI | 85.0 | 13.2 | 78.9 | 6.4 | 108.2 | Synergistic |

[a] Assay was performed using a 10 cm petri plates
[b] Fan was run continuous during treatment

Example 7: Synergistic Inhibition of PENIEX Pathogen by Benzoxaborole and $CO_2$ Treatment of Agar Plates (In Vitro)

Table 7 demonstrates that the present method may be used to inhibit growth of plant pathogens inoculated on agar plates. As expected, the plate treated with the control (i.e., air) showed the highest pathogenic growth of 32.8 mm of PENIEX. Methods of treating plant pathogens were used on agar plates growing PENIEX and treated with 12% $CO_2$ only had 25.8 mm of pathogenic growth. Plates growing PENIEX and treated with benzoxaborole Compound A only had 10.6 mm of pathogenic growth. However, the plates treated with both benzoxaborole Compound A and 12% $CO_2$ showed 4.7 mm of growth for PENIEX pathogens. The Colby calculation of 114.7 indicated that the benzoxaborole treatment with Compound A and $CO_2$ was synergistic over the other treatments to inhibit PENIEX growth in vitro.

TABLE 7

Synergistic effect of benzoxaborole Compound A and $CO_2$ on inhibition of in vitro fungal growth of *Penicillium expansum* (PENIEX) when evaluated 3 days after completion of treatment. [a, b]

| Cmpd | Rate (mg/L) | Pathogen | Growth (diameter, mm) | | | | Colby Calculation | Outcome |
| --- | --- | --- | --- | --- | --- | --- | --- | --- |
| | | | Control (Air) | Cmpd | 12% $CO_2$ | Cmpd + 12% $CO_2$ | | |
| A | 0.035 | PENIEX | 32.8 | 10.6 | 25.8 | 4.7 | 114.7 | Synergistic |

[a] Assay was performed using a 10 cm Petri plates
[b] Fan was run continuous during treatment

Example 8: Synergistic Inhibition of BOTRCI Pathogen by Benzoxaborole and CO$_2$ Treatment of Fruit (In Vivo)

Table 8 demonstrates that the present method may be used to inhibit growth of plant pathogens inoculated on fruit, such as strawberries. As expected, the fruit treated with the control (i.e., air) showed the highest pathogenic growth of 4.0 mm of BOTRCI. Methods of treating plant pathogens were used on fruit growing BOTRCI and treated with 12% CO$_2$ only had 3.7 mm of pathogenic growth. Fruit growing BOTRCI and treated with 0.14 mg/L of benzoxaborole Compound A only had 2.1 mm of pathogenic growth. However, the fruit treated with both benzoxaborole Compound A and 12% CO$_2$ only showed 0.4 mm of growth for BOTRCI pathogens. The Colby calculation of 176.2 indicated that the benzoxaborole treatment with Compound A and CO$_2$ was synergistic over the other treatments to inhibit BOTRCI growth in vivo.

TABLE 8

Synergistic effect of benzoxaborole Compound A and CO$_2$ on inhibition of in vivo fungal growth of *Botrytis cinerea* (BOTRCI) on strawberries when evaluated 2 days after completion of treatment. [a, b, c]

| | | | Growth (Severity, 0 to 4) | | | | | |
|---|---|---|---|---|---|---|---|---|
| Cmpd | Rate (mg/L) | Pathogen | Control (Air) | Cmpd | 12% CO$_2$ | Cmpd + 12% CO$_2$ | Colby Calculation | Outcome |
| A | 0.14 | BOTRCI | 4.0 | 2.1 | 3.7 | 0.4 | 176.2 | Synergistic |

[a] Experiment was performed with 4 replicates
[b] Fan was used for first 6 hours of treatment
[c] Additional water vapor was added to each chamber to achieve >90% R.H.

Example 9: Synergistic Inhibition of BOTRCI Pathogen by Benzoxaborole and CO$_2$ Treatment of Fruit (In Vivo)

Table 9 demonstrates that the present method may be used to inhibit growth of plant pathogens inoculated on fruit, such as strawberries. As expected, the fruit treated with the control (i.e., air) showed the highest pathogenic growth of 3.8 mm of BOTRCI. Methods of treating plant pathogens were used on fruit growing BOTRCI and treated with 12% CO$_2$ only had 3.5 mm of pathogenic growth. Fruit growing BOTRCI and treated with 0.14 mg/L of benzoxaborole Compound A only had 1.1 mm of pathogenic growth. However, the fruit treated with both benzoxaborole Compound A and 12% CO$_2$ showed 0.8 mm of growth for BOTRCI pathogens. The Colby calculation of 107.6 indicated that the benzoxaborole treatment with Compound A and CO$_2$ was synergistic over the other treatments to inhibit BOTRCI growth in vivo.

TABLE 9

Synergistic effect of benzoxaborole Compound A and CO$_2$ on inhibition of in vivo fungal growth of *Botrytiscinerea* (BOTRCI) on strawberries when evaluated 3 days after completion of treatment. [a, b]

| | | | Growth (Severity, 0 to 4) | | | | | |
|---|---|---|---|---|---|---|---|---|
| Cmpd | Rate (mg/L) | Pathogen | Control (Air) | Cmpd | 12% CO$_2$ | Cmpd + 12% CO$_2$ | Colby Calculation | Outcome |
| A | 0.14 | BOTRCI | 3.8 | 1.1 | 3.5 | 0.8 | 107.6 | Synergistic |

[a] Fan was used for first 6 hours of treatment
[b] Additional water vapor was added to each chamber to achieve >90% R H.

Example 10: Synergistic Inhibition of MUCOPI Pathogen by Benzoxaborole and CO$_2$ Treatment of Fruit (In Vivo)

Table 10 demonstrates that the present method may be used to inhibit growth of plant pathogens inoculated on fruit, such as strawberries. As expected, the fruit treated with the control (i.e., air) showed the highest pathogenic growth of 3.6 mm of MUCOPI. Methods of treating plant pathogens were used on fruit growing MUCOPI and treated with 12% CO$_2$ only had 3.0 mm of pathogenic growth. Fruit growing MUCOPI and treated with 0.14 mg/L of benzoxaborole Compound A only had 0.5 mm of pathogenic growth. However, the fruit treated with both benzoxaborole Compound A and 12% CO$_2$ showed 0.2 mm of growth for MUCOPI pathogens. The Colby calculation of 106.8 indicated that the benzoxaborole treatment with Compound A and CO$_2$ was synergistic over the other treatments to inhibit MUCOPI growth in vivo.

TABLE 10

Synergistic effect of benzoxaborole Compound A and $CO_2$ on inhibition of in vivo fungal growth of *Mucor piriformis* (MUCOPI) on strawberries when evaluated 2 days after completion of treatment. [a, b]

| Cmpd | Rate (mg/L) | Pathogen | Control (Air) | Cmpd | 12% $CO_2$ | Cmpd + 12% $CO_2$ | Colby Calculation | Outcome |
|---|---|---|---|---|---|---|---|---|
| A | 0.14 | MUCOPI | 3.6 | 0.5 | 3.0 | 0.2 | 106.8 | Synergistic |

[a] Fan was used for first 6 hours of treatment
[b] Additional water vapor was added to each chamber to achieve >90% R H.

Example 11: Synergistic Inhibition of BOTRCI Pathogen by Benzoxaborole and $CO_2$ Treatment of Fruit (In Vivo)

Table 11 demonstrates that the present method may be used to inhibit growth of plant pathogens inoculated on fruit, such as strawberries. As expected, the fruit treated with the control (i.e., air) showed the highest pathogenic growth of 3.7 mm of BOTRCI. Methods of treating plant pathogens were used on fruit growing BOTRCI and treated with 12% $CO_2$ only had 2.7 mm of pathogenic growth. Fruit growing BOTRCI and treated with 0.14 mg/L of benzoxaborole Compound A only 1.4 mm of pathogenic growth. However, the fruit treated with both benzoxaborole Compound A and 12% $CO_2$ showed 0.8 mm of growth for BOTRCI pathogens. The Colby calculation of 109.0 indicated that the benzoxaborole treatment with Compound A and $CO_2$ was synergistic over the other treatments to inhibit BOTRCI growth in vivo.

Fruit growing BOTRCI and treated with benzoxaborole Compound B only had 0.9 mm of pathogenic growth. However, the fruit treated with both benzoxaborole Compound B and 12% $CO_2$ showed 0.5 mm of growth for BOTRCI pathogens. The Colby calculation of 105.0 indicated that the benzoxaborole treatment with Compound B and $CO_2$ was synergistic over the other treatments to inhibit BOTRCI growth in vivo.

Example 12: Synergistic Inhibition of BOTRCI Pathogen by Benzoxaborole and $CO_2$ Treatment of Fruit (In Vivo)

Table 12 demonstrates that the present method may be used to inhibit growth of plant pathogens inoculated on fruit, such as strawberries. As expected, the fruit treated with the control (i.e., air) showed the highest pathogenic growth of 3.6 mm of BOTRCI. Methods of treating plant pathogens were used on fruit growing BOTRCI and treated with 12% $CO_2$ only had 3.4 mm of pathogenic growth. Fruit growing BOTRCI and treated with 0.14 mg/L of benzoxaborole Compound A only 0.7 mm of pathogenic growth. However, the fruit treated with both benzoxaborole Compound A and 12% $CO_2$ showed 0.4 mm of growth for BOTRCI pathogens. The Colby calculation of 107.9 indicated that the benzoxaborole treatment with Compound A and $CO_2$ was synergistic over the other treatments to inhibit BOTRCI growth in vivo.

Fruit growing BOTRCI and treated with benzoxaborole Compound B only had 0.4 mm of pathogenic growth. However, the fruit treated with both benzoxaborole Compound B and 12% $CO_2$ showed 0.3 mm of growth for BOTRCI pathogens. The Colby calculation of 100.9 indicated that the benzoxaborole treatment with Compound B and $CO_2$ was synergistic over the other treatments to inhibit BOTRCI growth in vivo.

TABLE 11

Synergistic effect of benzoxaborole Compounds A or B and $CO_2$ on inhibition of in vivo fungal growth of *Botrytis cinerea* (BOTRCI) on strawberries when evaluated 2 days after completion of treatment. [a, b]

| Cmpd | Rate (mg/L) | Pathogen | Control (Air) | Cmpd | 12% $CO_2$ | Cmpd + 12% $CO_2$ | Colby Calculation | Outcome |
|---|---|---|---|---|---|---|---|---|
| A | 0.14 | BOTRCI | 3.7 | 1.4 | 2.7 | 0.8 | 109.0 | Synergistic |
| B | 0.14 | BOTRCI | 3.7 | 0.9 | 2.7 | 0.5 | 105.0 | Synergistic |

[a] Fan was used for first 6 hours of treatment
[b] Additional water vapor was added to each chamber to achieve >90% R H.

TABLE 12

Synergistic effect of benzoxaborole Compounds A or B and $CO_2$ on inhibition of in vivo fungal growth of *Botrytis cinerea* (BOTRCI) on strawberries when evaluated 2 days after completion of treatment. [a, b]

| | | | Growth (Severity, 0 to 4) | | | | |
|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | BOTRCI | 3.6 | 0.7 | 3.4 | 0.4 | 107.9 | Synergistic |
| B | 0.14 | BOTRCI | 3.6 | 0.4 | 3.4 | 0.3 | 100.9 | Synergistic |

[a] Fan was used for first 6 hours of treatment
[b] Additional water vapor was added to each chamber to achieve >90% R.H.

Example 13: Synergistic Inhibition of BOTRCI Pathogen by Benzoxaborole and $CO_2$ Treatment of Fruit (In Vivo)

Table 13 demonstrates that the present method may be used to inhibit growth of plant pathogens inoculated on fruit, such as strawberries. As expected, the fruit treated with the control (i.e., air) showed the highest pathogenic growth of 3.4 mm of BOTRCI. Methods of treating plant pathogens were used on fruit growing BOTRCI and treated with 12% $CO_2$ only had 3.2 mm of pathogenic growth. Fruit growing BOTRCI and treated with 0.14 mg/L of benzoxaborole Compound A only had 2.4 mm of pathogenic growth. However, the fruit treated with both benzoxaborole Compound A and 12% $CO_2$ only showed 1.4 mm of growth for BOTRCI pathogens. The Colby calculation of 163.4 indicated that the benzoxaborole treatment with Compound A and $CO_2$ was synergistic over the other treatments to inhibit BOTRCI growth in vivo.

such as strawberries. As expected, the fruit treated with the control (i.e., air) showed the highest pathogenic growth of 4.0 mm of BOTRCI. Methods of treating plant pathogens were used on fruit growing BOTRCI and treated with 12% $CO_2$ only had 3.9 mm of pathogenic growth. Fruit growing BOTRCI and treated with 0.0044 mg/L or 0.0088 mg/L benzoxaborole Compound A only had 3.4 mm and 3.3 mm of pathogenic growth, respectively. However, the fruit treated with 0.0044 mg/L or 0.0088 mg/L of benzoxaborole Compound A and 12% $CO_2$ only showed 3.2 mm and 0.6 mm of growth for BOTRCI pathogens, respectively. The Colby calculation of 114.8 and 502.5 indicated that the benzoxaborole treatment with 0.0044 mg/L or 0.0088 mg/L Compound A, respectively, combined with $CO_2$ was synergistic over the other treatments to inhibit BOTRCI growth in vivo.

TABLE 13

Synergistic effect of benzoxaborole Compound A and $CO_2$ on the inhibition of in vivo fungal growth of *Botrytis cinerea* (BOTRCI) on strawberries when evaluated 3 days after completion of treatment. [a]

| | | | Growth (Severity, 0 to 4) | | | | |
|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.14 | BOTRCI | 3.4 | 2.4 | 3.2 | 1.4 | 163.4 | Synergistic |

[a] Fan was run continuously during treatment

Example 14: Synergistic Inhibition of BOTRCI Pathogen by Benzoxaborole and $CO_2$ Treatment of Fruit (In Vivo)

Table 14 demonstrates that the present method may be used to inhibit growth of plant pathogens inoculated on fruit,

TABLE 14

Synergistic effect of benzoxaborole Compound A and $CO_2$ on the inhibition of in vivo fungal growth of *Botrytis cinerea* (BOTRCI) on strawberries when evaluated 3 days after completion of treatment. [a]

| | | | Growth (Severity, 0 to 4) | | | | |
|---|---|---|---|---|---|---|---|
| Cmpd | Rate (mg/L) | Pathogen | Control (Air) | Cmpd | 12% $CO_2$ | Cmpd + 12% $CO_2$ | Colby Calculation | Outcome |
| A | 0.0044 | BOTRCI | 4.0 | 3.4 | 3.9 | 3.2 | 114.8 | Synergistic |
| A | 0.0088 | BOTRCI | 4.0 | 3.3 | 3.9 | 0.6 | 502.5 | Synergistic |

[a] Fan was run continuous during treatment

Example 15: Synergistic Inhibition of BOTRCI Pathogen by Benzoxaborole and $CO_2$ Treatment of Fruit (In Vivo)

Table 15 demonstrates that the present method may be used to inhibit growth of plant pathogens inoculated on fruit, such as Table grapes. As expected, the fruit treated with the control (i.e., air) showed the highest pathogenic growth of 1.6 mm of BOTRCI. Methods of treating plant pathogens were used on fruit growing BOTRCI and treated with 12% $CO_2$ only had 1.4 mm of pathogenic growth. Fruit growing BOTRCI and treated with 0.035 mg/L of benzoxaborole Compound A only had 0.9 mm of pathogenic growth. However, the fruit treated with both benzoxaborole Compound A and 12% $CO_2$ only showed 0.7 mm of growth for BOTRCI pathogens. The Colby calculation of 115.2 indicated that the benzoxaborole treatment with Compound A and $CO_2$ was synergistic over the other treatments to inhibit BOTRCI growth in vivo.

TABLE 15

Synergistic effect of benzoxaborole Compound A and $CO_2$ on inhibition of in vivo fungal growth of *Botrytis cinerea* (BOTRCI) on table grapes when evaluated 1 day after completion of treatment. [a]

| Cmpd | Rate (mg/L) | Pathogen | Growth (Severity, 0 to 4) | | | | Colby Calculation | Outcome |
| | | | Control (Air) | Cmpd | 12% $CO_2$ | Cmpd + 12% $CO_2$ | | |
|---|---|---|---|---|---|---|---|---|
| A | 0.035 | BOTRCI | 1.6 | 0.9 | 1.4 | 0.7 | 115.2 | Synergistic |

[a] Fan was run continuous during treatment

Example 16: Synergistic Inhibition of PENIEX Pathogen by Benzoxaborole and $CO_2$ Treatment of Fruit (In Vivo)

Table 16 demonstrates that the present method may be used to inhibit growth of plant pathogens inoculated on fruit, such as Table grapes. As expected, the fruit treated with the control (i.e., air) showed the highest pathogenic growth of 2.4 mm of PENIEX. Methods of treating plant pathogens were used on fruit growing PENIEX and treated with 12% $CO_2$ only had 1.9 mm of pathogenic growth. Fruit growing PENIEX and treated with 0.035 mg/L of benzoxaborole Compound A only had 1.8 mm of pathogenic growth. However, the fruit treated with both benzoxaborole Compound A and 12% $CO_2$ only showed 1.3 mm of growth for PENIEX pathogens. The Colby calculation of 108.2 indicated that the benzoxaborole treatment with Compound A and $CO_2$ was synergistic over the other treatments to inhibit PENIEX growth in vivo.

TABLE 16

Synergistic effect of benzoxaborole Compound A and $CO_2$ on inhibition of in vivo fungal growth of *Penicillium expansum* (PENIEX) on table grapes when evaluated 1 day after completion of treatment. [a]

| Cmpd | Rate (mg/L) | Pathogen | Growth (Severity, 0 to 4) | | | | Colby Calculation | Outcome |
| | | | Control (Air) | Cmpd | 12% $CO_2$ | Cmpd + 12% $CO_2$ | | |
|---|---|---|---|---|---|---|---|---|
| A | 0.035 | PENIEX | 2.4 | 1.8 | 1.9 | 1.3 | 108.2 | Synergistic |

[a] Fan was run continuous during treatment

The preceding description enables others skilled in the art to utilize the technology in various embodiments and with various modifications as are suited to the particular use contemplated. In accordance with the provisions of the patent statutes, the principles and modes of operation of this disclosure have been explained and illustrated in exemplary embodiments. Accordingly, the present invention is not limited to the particular embodiments described and/or exemplified herein.

It is intended that the scope of disclosure of the present technology be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

The scope of this disclosure should be determined, not only with reference to the above description, but should instead be determined with reference to the appended claims, along with the full scope of equivalents to which such claims are entitled. It is anticipated and intended that future developments will occur in the arts discussed herein, and that the disclosed compositions and methods will be incorporated into such future examples.

Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the disclosure and that the technology within the scope of these claims and their equivalents be covered thereby. In sum, it should be understood that the disclosure is capable of modification and variation and is limited only by the following claims

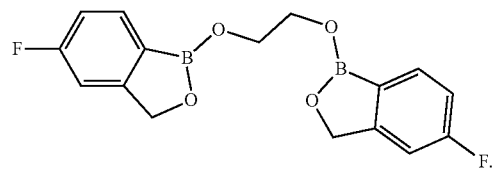 [SMILES: Fc1ccc2c(c1)COB2OCCOB1OCc2cc(F)ccc21]

What is claimed is:

1. A method of treating plants with an antimicrobial treatment comprising:
placing one or more plants or plant parts in a chamber,
sealing the chamber,
adding a benzoxaborole compound to the chamber,
adding $CO_2$ to the chamber,
wherein the benzoxaborole compound and the $CO_2$ combine to form the antimicrobial treatment,
administering the antimicrobial treatment to the one or more plants or plant parts in the sealed chamber,
unsealing the chamber,
wherein 1-methylcyclopropene is not combined with the benzoxaborole,
wherein the combination of the benzoxaborole and the $CO_2$ provide synergistic inhibition of plant pathogens on the one or more treated plants or plant parts,
wherein the benzoxaborole has the structure,

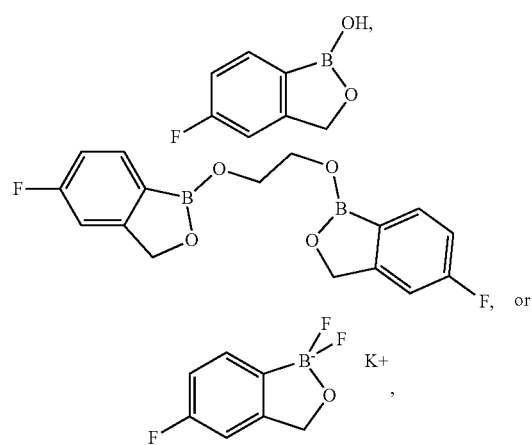

or analogs or derivatives thereof,
wherein the $CO_2$ concentration is about 12%, and
wherein the benzoxaborole is applied from about .004mg/L to about 0.15mg/L.

2. The method of claim 1, wherein the one or more plants or plant parts is a soft fruit.

3. The method of claim 2, wherein the soft fruit is selected from the group consisting of a strawberry, a raspberry, a blackberry, and a grape.

4. The method of claim 1, wherein the benzoxaborole compound is in the form of a liquid, a gas, a fog, or a solid.

5. The method of claim 4, wherein the solid benzoxaborole compound is a powder.

6. The method of claim 1, wherein the antimicrobial treatment is in the form of a spray, a mist, a gel, a thermal fog, a non-thermal fog, a dip, a drench, a vapor, a gas, or sublimation.

7. The method of claim 1, wherein the antimicrobial treatment further comprises a treatment carrier.

8. The method of claim 1, wherein the antimicrobial treatment is effective against fungal pathogens.

9. The method of claim 8, wherein the fungal pathogens are selected from the group consisting of *Acremonium* spp., *Albugo* spp., *Alternaria* spp., *Ascochyta* spp., *Aspergillus* spp., *Botryodiplodia* spp., *Botryospheria* spp., *Botrytis* spp., *Byssochlamys* spp., *Candida* spp., *Cephalosporium* spp., *Ceratocystis* spp., *Cercospora* spp., *Chalara* spp., *Cladosporium* spp., *Colletotrichum* spp., *Cryptosporiopsis* spp., *Cylindrocarpon* spp., *Debaryomyces* spp., *Diaporthe* spp., *Didymella* spp., *Diplodia* spp., *Dothiorella* spp., *Elsinoe* spp., *Fusarium* spp., *Geotrichum* spp., *Gloeosporium* spp., *Glomerella* spp., *Helminthosporium* spp., *Khuskia* spp., *Lasiodiplodia* spp., *Macrophoma* spp., *Macrophomina* spp., *Microdochium* spp., *Monilinia* spp., *Monilochaethes* spp., *Mucor* spp., *Mycocentrospora* spp., *Mycosphaerella* spp., *Nectria* spp., *Neofabraea* spp., *Nigrospora* spp., *Penicillium* spp., *Peronophythora* spp., *Peronospora* spp., *Pestalotiopsis* spp., *Pezicula* spp., *Phacidiopycnis* spp., *Phoma* spp., *Phomopsis* spp., *Phyllosticta* spp., *Phytophthora* spp., *Polyscytalum* spp., *Pseudocercospora* spp., *Pyricularia* spp., *Pythium* spp., *Rhizoctonia* spp., *Rhizopus* spp., *Sclerotium* spp., *Sclerotinia* spp., *Septoria* spp., *Sphaceloma* spp., *Sphaeropsis* spp., *Stemphyllium* spp., *Stilbella* spp., *Thielaviopsis* spp., *Thyronectria* spp., *Trachysphaera* spp., *Uromyces* spp., *Ustilago* spp., *Venturia* spp., and *Verticillium* spp., and bacterial pathogens, such as *Bacillus* spp., *Campylobacter* spp., *Clavibacter* spp., *Clostridium* spp., *Erwinia* spp., *Escherichia* spp., *Lactobacillus* spp., *Leuconostoc* spp., *Listeria* spp., *Pantoea* spp., *Pectobacterium* spp., *Pseudomonas* spp., *Ralstonia* spp., *Salmonella* spp., *Shigella* spp., *Staphylococcus* spp., *Vibrio* spp., *Xanthomonas* spp., and *Yersinia* spp.

10. The method of claim 9, wherein the fungal pathogens are selected from the group consisting of *Botrytis cinerea*, *Mucor piriformis*, *Fusarium sambucinum*, *Aspergillus brasiliensis*, and *Peniciliium expansum*.

11. The method of claim 1, wherein the method results in synergistic inhibition having a Colby calculation of 100.4 to 502.5.

12. The method of claim 1, wherein the plant pathogen is a fungal plant pathogen.

13. The method of claim 12, wherein the benzoxaborole has the structure of

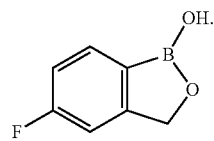

14. The method of claim 12, wherein the benzoxaborole has the structure of